United States Patent [19]
Whitby et al.

[11] Patent Number: 5,558,200
[45] Date of Patent: Sep. 24, 1996

[54] CONTAINER TRANSFER SYSTEM FOR COATING LINE WITH ROTARY LOADER, PLUNGER CHUCK AND KNOCK-OFF MECHANISMS

[75] Inventors: Thomas G. Whitby, Seven Hills; Kenneth A. Krismanth, Strongsville; Joseph R. Lawn, Brecksville; David W. Black, Richfield, all of Ohio

[73] Assignee: FECO Engineered Systems, Inc., Cleveland, Ohio

[21] Appl. No.: 234,299

[22] Filed: Apr. 28, 1994

[51] Int. Cl.$^6$ .................................................. B65G 25/00
[52] U.S. Cl. ...................... 198/470.1; 198/482.1
[58] Field of Search .............................. 198/470.1, 476.1, 198/482.1, 485.1, 477.1

[56] References Cited

U.S. PATENT DOCUMENTS

| | | |
|---|---|---|
| 1,944,255 | 1/1934 | McFall et al. . |
| 2,882,061 | 4/1959 | Johnson . |
| 3,124,232 | 3/1964 | Humen ................................ 198/470.1 |
| 3,545,803 | 12/1970 | Ruscitti . |
| 3,938,847 | 2/1976 | Peyton ........................ 198/470.1 X |
| 3,944,058 | 3/1976 | Strauss . |
| 3,945,486 | 3/1976 | Cooper . |
| 4,032,185 | 6/1977 | Peyton . |
| 4,086,999 | 5/1978 | McDonald . |
| 4,291,910 | 9/1981 | Maupate . |
| 4,304,398 | 12/1981 | Crowell . |
| 4,340,249 | 7/1982 | Bucklew . |
| 4,540,211 | 9/1985 | Masserang . |
| 4,541,524 | 9/1985 | McGill et al. .................... 198/470.1 |
| 4,572,355 | 2/1986 | Hunter . |
| 4,640,406 | 2/1987 | Willison ........................ 198/470.1 X |
| 4,890,726 | 1/1990 | Wissmann . |
| 4,927,205 | 5/1990 | Bowler et al. . |
| 5,031,749 | 7/1991 | McCoy .......................... 198/470.1 X |

FOREIGN PATENT DOCUMENTS

| | | |
|---|---|---|
| 503867 | 1/1978 | Australia . |
| 2241476 | 3/1975 | France . |
| 59-158741 | 9/1984 | Japan . |
| 8505346 | 12/1985 | WIPO . |

*Primary Examiner*—James R. Bidwell
*Attorney, Agent, or Firm*—Renner, Otto, Boisselle & Sklar

[57] ABSTRACT

An article transfer system and method and various components thereof that provide various benefits and advantages comprises a conveyor carrying a plurality of article holding devices having an eject feature, a rotary loader for loading articles onto the holding devices carried by the conveyor for transfer through one or more processing stations including, for example, a spray coating station, and a rotary unloader for removing the articles from the holding devices. Provision also is made for selective removal of articles from the holding devices at one or more strategic locations along the conveyor.

24 Claims, 10 Drawing Sheets

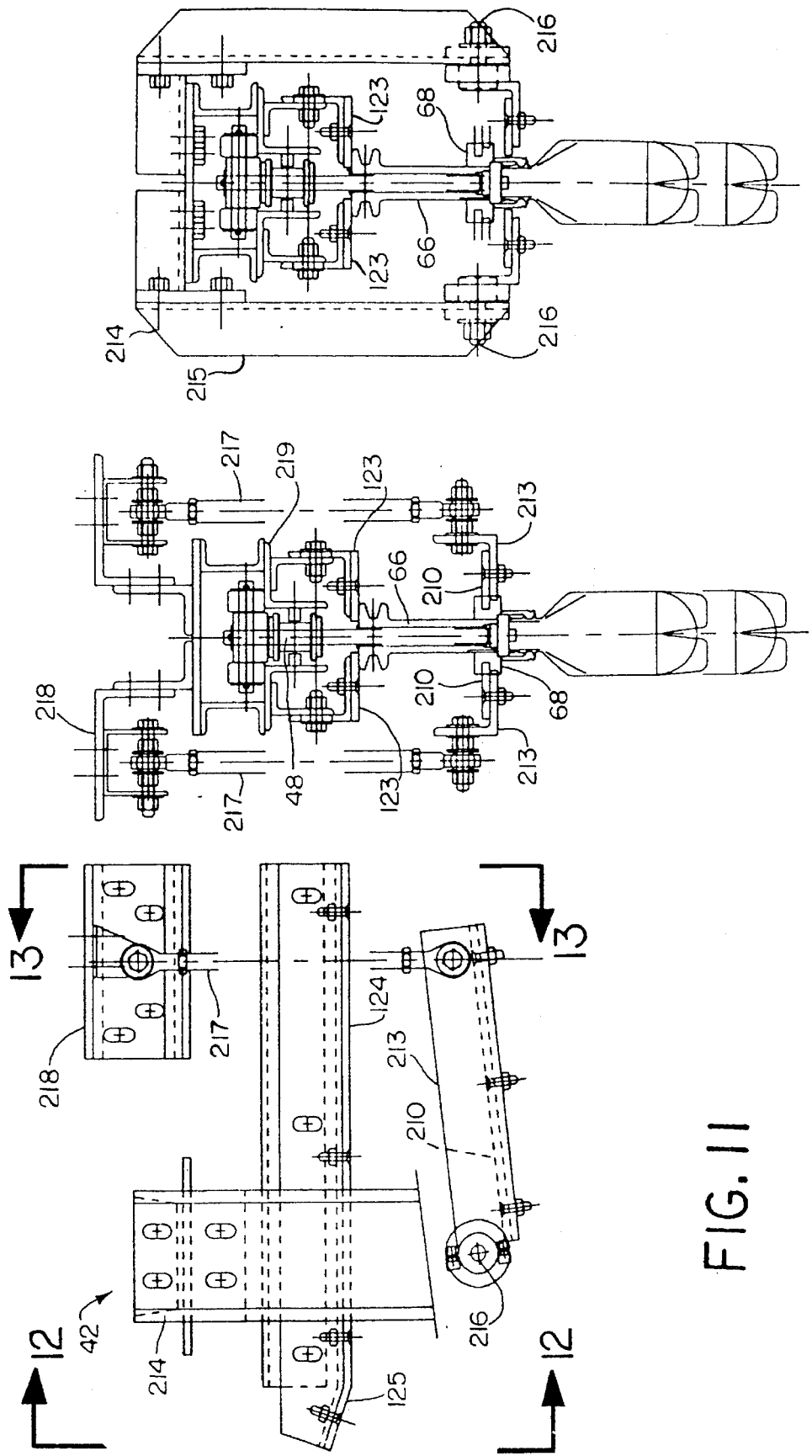

CONTAINER TRANSFER SYSTEM FOR COATING LINE WITH ROTARY LOADER, PLUNGER CHUCK AND KNOCK-OFF MECHANISMS

The invention hereindescribed relates generally to systems for handling articles including, in particular, containers and for moving them through various operational steps in an efficient and controlled manner. More particularly, the invention is directed to a container transfer system and components thereof particularly suited for spray coating operations such as where a glass or plastic bottle is provided with a coating to obtain desired decorative finish, strength, low permeability or other characteristics.

BACKGROUND OF THE INVENTION

Prior art container transfer systems heretofore have employed a conveyor equipped with container holding devices for holding containers to the conveyor for conveyance from an input station through one or more processing stations to an output station, a container loading mechanism for automatically transferring containers onto the conveyor, and a container unloading mechanism for automatically transferring containers from the conveyor. The container holding devices for receiving and securely gripping open-ended containers have employed an elongated spindle and a chuck mounted for telescoping movement on the spindle. Various types of chucks have been devised including chucks with jaws arranged around a spindle and engageable by a cam on the spindle which controls radial expansion and contraction of the jaws for internally gripping a container. Other chucks have been devised for externally gripping the neck of a container such as shown in U.S. Pat. Nos. 4,625,854 and 4,640,406.

SUMMARY OF THE INVENTION

The present invention provides improvements in a transfer system for articles including, in particular, containers such as bottles. The system is particularly suited for spray coating operations such as where a glass or plastic bottle is provided with a coating to obtain desired decorative finish, strength and/or other characteristics.

More particularly, the invention provides an article transfer system and method, and various components thereof, that provide various benefits and advantages. In general, an article transfer system according to the invention generally comprises a conveyor, a loader for loading articles onto holding devices carried by the conveyor for transfer through one or more processing stations including, for example, a spray coating station, and an unloader for removing the articles from the holding devices. Provision also is made for selective removal of articles from the holding devices at one or more strategic locations along the conveyor.

According to one aspect of the invention, a loader for loading articles of the type having a circumferential flange (radial protrusion) onto holding devices carried on an overhead conveyor, comprises a transfer device for transferring the articles from an infeed conveyor and sequentially presenting the articles to a transfer station; a rotary device for receiving the articles from the transfer device at the transfer station and for rotatably carrying the articles away from the transfer station along an arcuate path, the rotary device including a circumferential arrangement of positioning members for circumferentially spacing the articles, each positioning member including a pair of laterally spaced apart arms for receiving therebetween the article and for supportingly engaging the underside of the circumferential flange of the article; guide structure for guiding the holding devices of the overhead conveyor above and coextensively with a portion of the arcuate path in timed relationship with the positioning members; and lift structure for progressively axially raising the positioning members during travel through said portion of the arcuate path for loading the articles onto article holding devices of the overhead conveyor.

In a preferred embodiment of the loader, the lift structure includes a carrousel having a vertical rotational axis and a circumferential arrangement of lift devices mounted to the carrousel for vertical movement, the positioning members are respectively being carried on the lift devices, and the lift structure includes an arcuate cam means for controllably raising the lift devices. The transfer device includes rotating means for receiving articles from the infeed conveyor at a first location and for rotatably carrying the articles to the transfer station. The rotating means includes positioning means for circumferentially equally spacing the articles carried by the rotating means, and the rotating means includes rotating plate means for supporting the articles carried thereon. The positioning means may include means forming a circumferential arrangement of radially outwardly opening recesses for receiving and positioning articles. Provision may be made for adjusting the elevation of the rotating plate means for accommodating different heights of articles. Furthermore, the means forming a circumferential arrangement of radially outwardly opening recesses may include a star wheel including the radially outwardly opening recesses around the periphery thereof.

The loader is particularly useful in a transfer system including the overhead conveyor comprising a conveyor chain and a plurality of vertically elongated attachment devices for dependently supporting article gripping chucks from the conveyor chain at respective spaced apart positions along the length of the conveyor chain. The guide structure includes a sprocket for the conveyor chain and means, such as a star wheel, for supporting the attachment devices intermediate the conveyor chain and the chucks. In a preferred embodiment, the chucks are maintained at a constant elevation relative to the conveyor chain as they move coextensively with said portion of the arcuate path.

According to another aspect of the invention, an article conveying device comprises a conveyor and at least one article holder attached to the conveyor for movement therewith along a conveyor path. The article holder includes a support member having an axis extending generally perpendicular to the conveyor path, and a chuck carried on the support member for telescoping axial movement between first and second axially displaced positions. The chuck is radially expandable and contractible and has an interior socket for receiving therein an end of an article to be gripped by the chuck when the chuck is in the first position. The support member has a plunger portion movable axially into the socket when the chuck moves from the first position on the support member to the second position for engaging and axially ejecting the article out of the socket.

In a preferred embodiment, the support member has a main portion to which the plunger portion is removably connected, and the chuck is retained on the support member by the plunger portion that forms an axial obstruction preventing the chuck from separating from the support member. The chuck includes a base supported on the support member at an end thereof and a circumferential arrangement of radially movable gripping fingers extending axially outwardly from the base and defining therebetween the socket for receiving therein an end of an article to be gripped.

According to still another aspect of the invention, an article transfer system comprises an overhead conveyor including a plurality of article holding devices, the holding devices including a support and a relatively movable activating member for releasing an article from the device; means for guiding the article holding devices along a path; cam means for moving the activating member relative to the support of the holding devices as the holding devices are sequentially moved to engagement therewith by the conveyor; and means for selectively moving the cam means from an ambush position allowing the holding devices to pass thereby without being engaged by the cam means to an operating position locating the cam means in the path of the activating member for moving the activating member relative to the support for releasing an article from the device. Preferably, the cam means is supported for pivotal movement about an axis extending perpendicular to the path of the conveyor, and the means for selectively moving includes linear extension and retraction means for swinging the cam means into and out of the path of the activating members.

The invention also provides a method for loading articles of the type having a circumferential flange (radial protrusion) onto holding devices carried on an overhead conveyor, comprising the steps of transferring the articles from an infeed conveyor and sequentially presenting the articles to a transfer station; using a rotary device to receive the articles from the transfer device at the transfer station and to rotatably carry the articles away from the transfer station along an arcuate path, the rotary device including a circumferential arrangement of positioning members for circumferentially spacing the articles and each positioning member including a pair of laterally spaced apart arms for receiving therebetween the article and for supportingly engaging the underside of the circumferential flange of the article; guiding the holding devices of the overhead conveyor above and coextensively with a portion of the arcuate path in timed relationship with the positioning members; and progressively axially raising the positioning members during travel through the portion of the arcuate path for loading the articles onto article holding devices of the overhead conveyor.

Also provided is a method for selectively removing articles from an overhead conveyor including a plurality of article holding devices, the holding devices including a support and a relatively movable activating member for releasing an article from the device, and the method comprising the steps of guiding the article holding devices along a path, selectively moving a cam from an ambush position allowing the holding devices to pass thereby without being engaged by the cam to an operating position locating the cam in the path of the activating member for moving the activating member relative to the support for releasing an article from the device, and thereafter returning the cam to its ambush position to allow the holding devices to once again pass thereby without being engaged by the cam to the operating position thereof.

The foregoing and other features of the invention are hereinafter full described and particularly pointed out in the claims, the following description and the annexed drawings setting forth in detail a certain illustrative embodiment of the invention, this being indicative, however, of but one of the various ways in which the principles of the invention may be employed.

BRIEF DESCRIPTION OF THE DRAWINGS

A preferred embodiment of the invention has been chosen for purposes of illustration and is shown in the accompanying drawings. In these drawings, from which various parts have been removed or broken away for illustration purposes.

FIG. 11 is a side elevational view of a knock-off mechanism employed in the system of FIG. 1;

FIG. 12 is a downstream end view of the knock-off mechanism looking from the line 12—12 of FIG. 11;

FIG. 13 is an upstream end view of the knock-off mechanism looking from the line 12—12 of FIG. 11;

DETAILED DESCRIPTION OF THE INVENTION

Because the invention was conceived and developed for use in transferring containers such as glass or plastic bottles through one or more processing stations, and is particularly useful for such, it will be described herein chiefly in this context. Moreover, the system is particularly suited for spray coating operations such as where a glass or plastic bottle is provided with a coating to obtain desired decorative finish, strength, low permeability or other characteristics. However, the invention in its broader aspects may be applied to transfer other types of articles in other types of applications.

Figure 1:
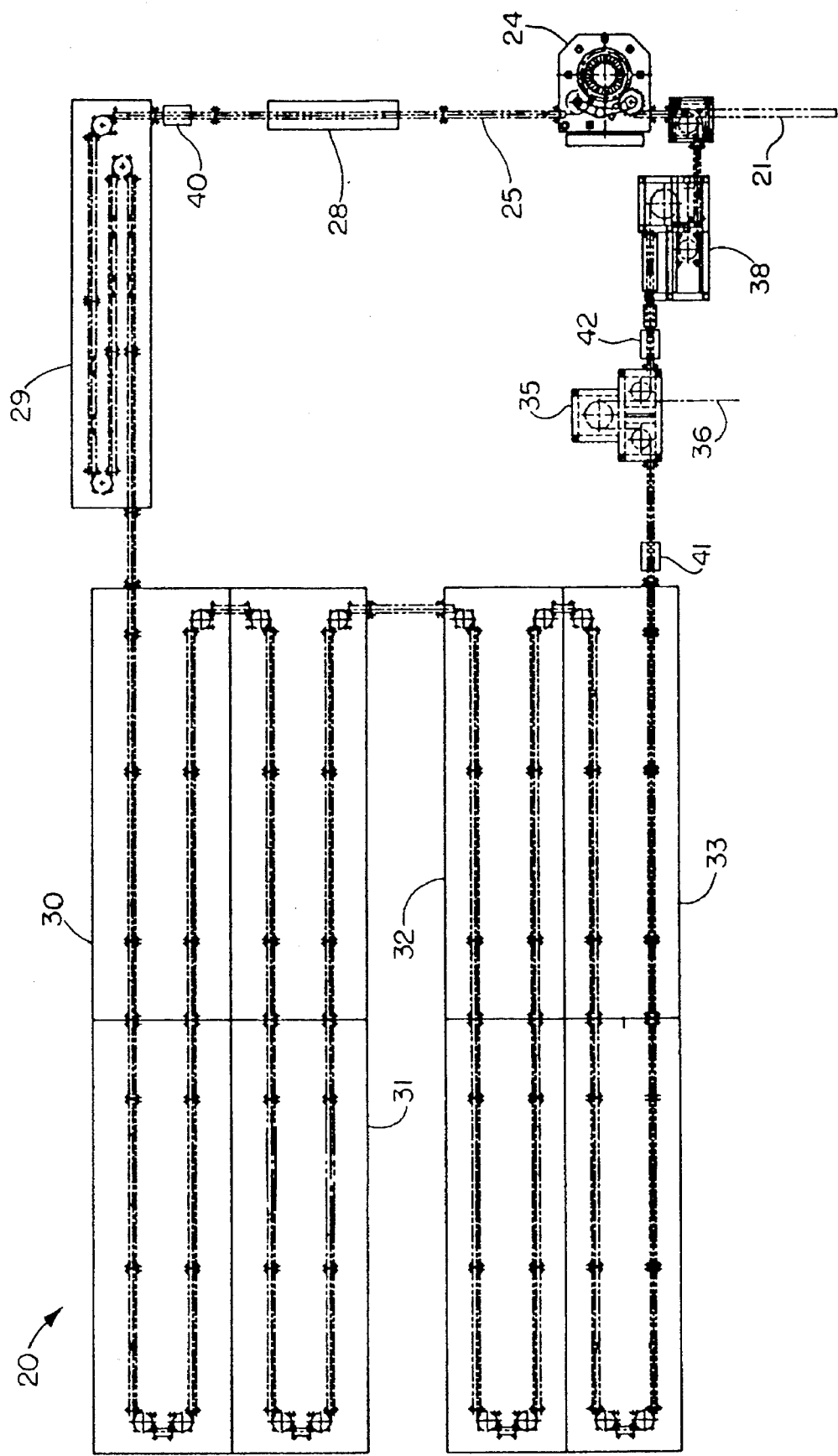
FIG. 1 is a schematic plan view of an article transfer system including a carrier conveyor particularly adapted for transferring bottles from a loader through various processing stations to an unloader.

In FIG. 1, a preferred embodiment of a container transfer system according to the invention is designated generally by reference numeral 20. The system 20 includes an infeed conveyor 21 which may be of mass transport type for single file delivery of containers such as plastic bottles B (FIG. 2) to a loading mechanism (or more simply loader) 24. As the illustrated system is particularly adapted for transferring plastic bottles, reference hereinafter will be made to plastic bottles as the article being transferred. However, it should be understood that the system may be adapted or otherwise modified to transfer other types of containers and, more generally, other types of articles.

Figure 2:
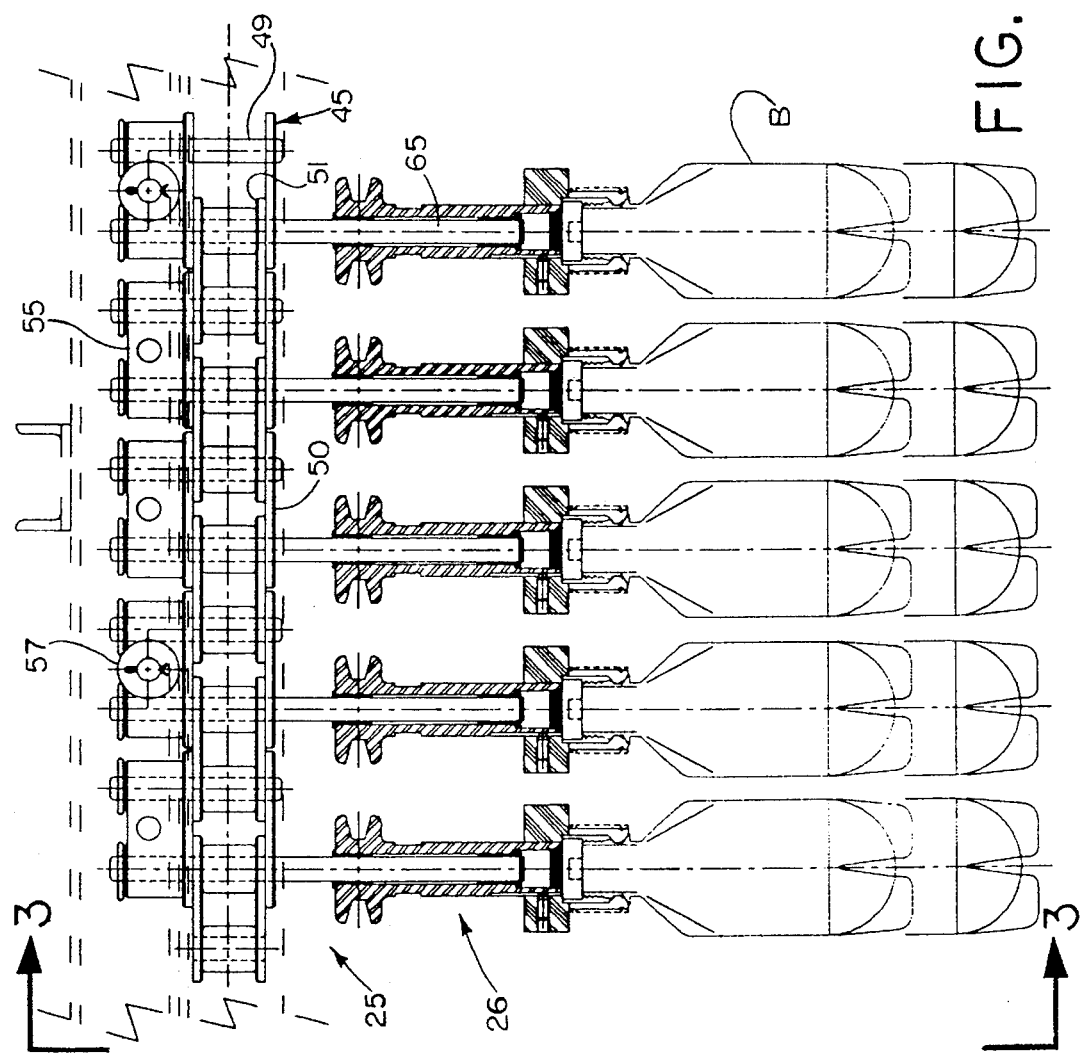
FIG. 2 is a side elevational view of a portion of the carrier conveyor, showing a number of holding devices thereof.

The loader 24 operates to automatically transfer the bottles onto an elevated carrier conveyor 25 equipped with bottle holding devices 26 preferably located on precise centers as shown in FIG. 2. The bottles are timed, spaced and loaded onto the overhead carrier conveyor 25 which moves the bottles in timed and spaced relationship to and through one or more processing stations. In the illustrated exemplary system, the bottles are moved by the carrier conveyor 25 through a spray booth 28 for applying a coating to the outer surface of the plastic bottles, then through a flash off processing station 29 and one or more curing ovens 30–33, other processing stations if desired, and finally to an unloading mechanism (or more simply unloader) 35. The unloader 35 operates to automatically transfer the bottles from the overhead carrier conveyor 25 to an outfeed or take-away conveyor 36 which may be of mass transport type.

The system 20 also includes a conveyor drive and take-up mechanism 38 for controllably driving the conveyor. Also, in accordance with the invention, there are strategically located one or more bottle knock-off mechanisms 40–42. In the event that a bottle becomes hung up on a holding device and fails to unload at the unloader 35, the knock-off mechanism 42 will ensure removal of the hung-up bottle prior to passage of the holding device to the loader 24. The knock-off mechanisms 40 and 41 are provided to enable bottles to be selectively removed from the conveyor at strategic locations such as between the coating processing station 28 and the flash-off processing station 29 and between the ovens 30–33 and the unloader 35, as may be desired for sampling purposes or for emptying the conveyor of bottles independently of the unloader.

Figure 3:
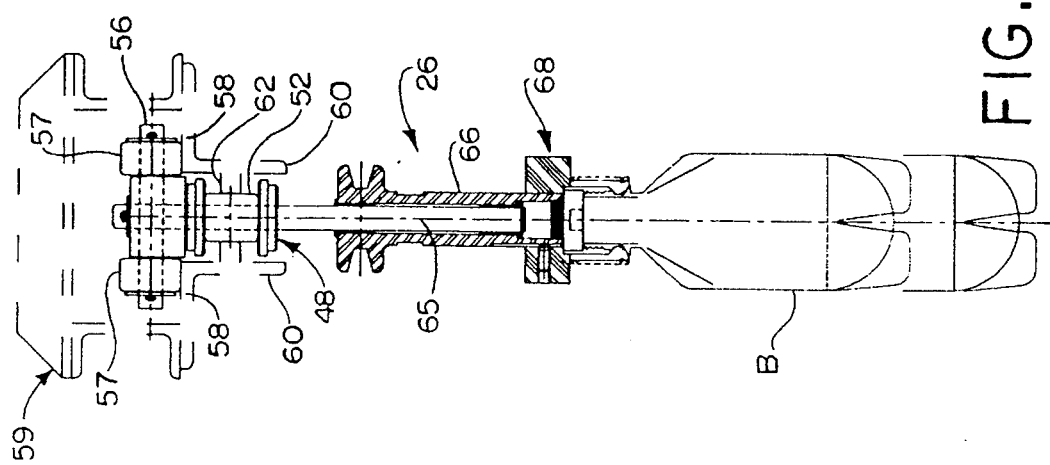
FIG. 3 is a transverse sectional view taken along the line 3—3 of FIG. 2.

As shown in FIGS. 2 and 3, the carrier conveyor 25 comprises an endless chain conveyor 45 to which the holding devices 26 are attached and located on precise centers. In the illustrated system, the chain conveyor 45 not only carries and moves the holding devices 26 horizontally along the path of the carrier conveyor, but it also is used to drive the loader and unloader 35, and further to maintain proper timing in the system. The chain conveyor 45, holding devices 26, loader 24, unloader 35 and knock-off mechanisms 40–42 are hereinafter described in greater detail.

THE CHAIN CONVEYOR AND HOLDING DEVICES

In FIGS. 2 and 3, a section of the chain conveyor 45 is shown in side elevational view and transverse cross-sectional view, respectively. Also shown are representative holding devices 26 which are spaced apart, preferably equally, along the length of the chain conveyor. The chain conveyor includes a roller chain 48 comprising, in repetition, a link pin 49 connecting outer links 50 to inner links 51 for articulated movement. Mounted for rotation on the pin 49 between the inner lengths is a roller 52.

In the illustrated embodiment, the chain conveyor 45 and holding devices 26 of the carrier conveyor 25 are oriented to hold bottles in vertical position during horizontal translating movement thereof along the path of the carrier conveyor. More particularly, the link pins 49 of the roller chain 48 are oriented vertically for relative pivoting movement of the links 50, 51 about vertical axes.

Upper extensions of relatively adjacent link pins have assembled thereon a coupler block 55. At spaced intervals along the length of the conveyor chain, an axle 56 is provided in a transverse base in a respective coupler block. Mounted to the ends of the axle 56 outwardly of the coupler block 55 are respective carrier rollers 57 which ride on respective runner rails 58 of a fabricated conveyor track assembly 59. The runner rails 58 include respective depending flanges 60 in spaced apart parallel relationship. The flanges 60 define therebetween a channel through which the roller chain 48 moves. Transverse alignment of the roller chain is maintained by guide blocks 62 attached to the depending flanges 60 of the runner rails. The guide blocks 62 project inwardly and define therebetween a containment space for guided passage therebetween of the link pin rollers 52.

Figure 4:
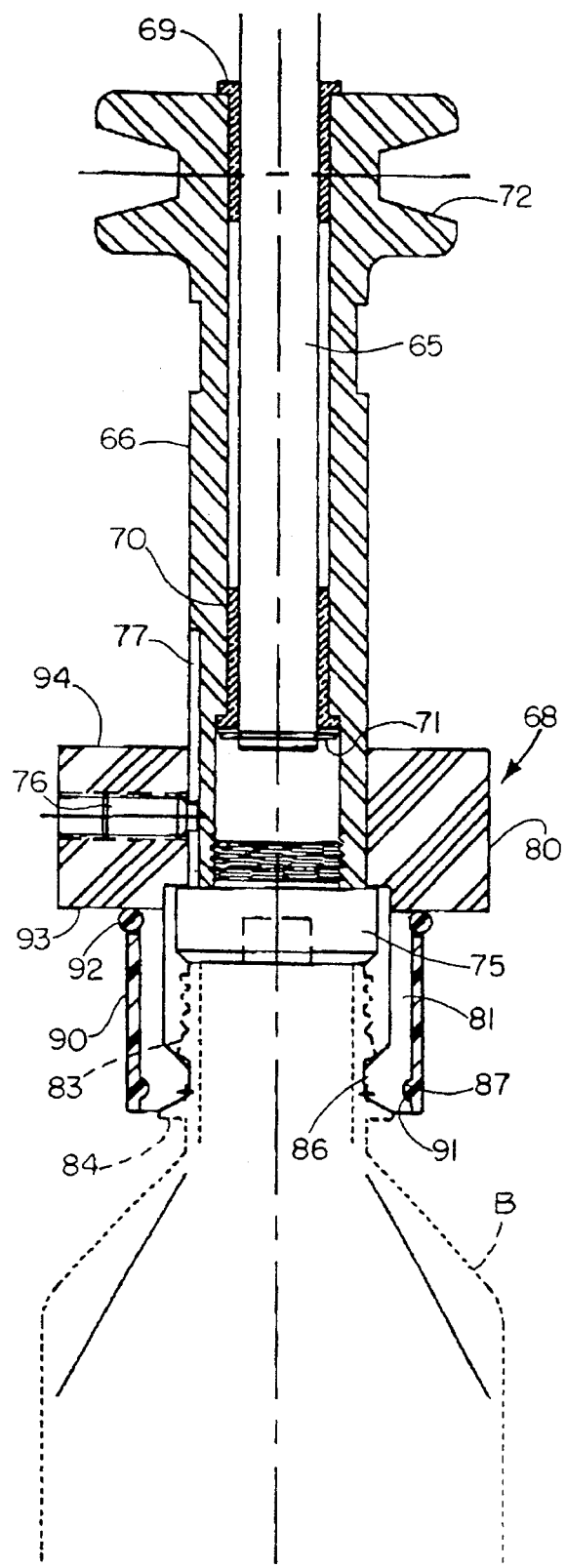
FIG. 4 is an enlargement of a portion of FIG. 3 showing the chuck of a holding device in its lower or engaged position.

At each mounting location for a holding device 26, the roller chain 48 has a depending attachment pin 65, which attachment pin may be an integral extension of a link pin 49 as shown. The holding device 26 generally includes a spindle 66 mounted for rotation on the attachment pin 65 and a gripping device 68 mounted on the spindle for limited axial movement. As best shown in FIG. 4, the spindle 66 has a tubular body concentric with and rotatably mounted on the attachment pin by a flange bearing 69 and a thrust bearing 70 that is retained on the attachment pin by a retaining ring 71. The upper end of the spindle is radially enlarged and has therein a circumferential spindle groove 72. The spindle groove 72 provides for rotating the spindle relative to the attachment pin.

In the illustrated embodiment the spindle groove 72, which is concentric with the rotational axis of the spindle 66, is configured to engage a belt (not shown) provided at locations along the conveyor path where it is desired to rotate the spindle in order to rotate a bottle or other article held to the spindle by the gripping member, as within the spray booth 28 and ovens 30–33. The belt (which may be of circular cross-section) may extend along the path of the holding device and may be resiliently biased against the spindles such that horizontal translating movement of the holding device relative to the belt effects rotation of the spindle. Additionally or alternatively, the belt may be driven to rotate the spindle at a speed independently of the speed of the conveyor chain. Of course, other means may be provided to rotate the spindle. By way of further example, the spindle may be equipped with a sprocket for engaging a chain in a manner similar to that just described above with respect to the spindle groove and belt. Accordingly, various means may be employed to rotate the spindle within the broad scope of the present invention.

With reference to FIG. 4, the gripping device 68 is in the form of a chuck that is mounted on the spindle 66 for telescoping sliding movement between upper and lower positions. The lowermost position is determined by the head of a plug 75 threaded into the lower end of the spindle. The head of the plug, also herein referred to as a plunger, protrudes radially beyond the spindle and forms a stop shelf that limits axial downward movement of the chuck relative to the spindle. The maximum upper range of movement of the chuck relative to the spindle is limited by engagement of a set pin (or dog) 76 against the upper end of a slot 77 in which the radially inner end of the set pin moves. However, the chuck normally will not be raised to such uppermost position, as the chuck need only be raised sufficiently to discharge a bottle therefrom in the hereinafter described manner. More importantly, the set pin 76, which functions as a key, cooperates with the slot to key the chuck to the spindle for common rotation. As will be appreciated, the chuck may be replaced with different sizes and/or types of chucks by simply removing (unscrewing) the plug 75 from the spindle which allows the chuck to slip off the end of the spindle. A new chuck or other gripping device may then be reassembled to the spindle as may be desired.

In the illustrated embodiment, the chuck 68 has a main body portion 80 from which a circumferential arrangement of gripping fingers 81 depend axially to define therebetween a socket for receiving the neck of a bottle. As best shown in FIG. 4, the neck of the bottle has an externally threaded upper portion that terminates at its lower end at an annular flange or bead 83. Axially spaced below the annular bead 83 is an annular neck flange 84 having a flat underside, as of the type commonly provided on bottles and the like for use in conjunction with air conveyors. The annular bead 83 and annular flange 84 form therebetween an annular groove 85 in which may be engaged radially inward projections or latching dogs 86 provided at the lower ends of the gripping fingers.

The gripping device or chuck 68 is generally of conventional design. As previously practiced in the prior art, the fingers are provided at their radially outward sides with a groove like that shown at 87 in FIG. 4. To prevent the gripping fingers from becoming coated by overspray or otherwise with material being sprayed or otherwise applied onto the exterior of the bottle or other article, there is provided a tubular shield or masking sleeve 90 that is telescoped over the gripping fingers. The masking sleeve 90 preferably is a tubular elastomeric thin walled body that closely circumscribes the gripping fingers preferably over the entire axial length thereof. The sleeve may extend to the bottom of main body portion 80 to completely cover the exterior surfaces of the fingers. However, as shown, the sleeve may terminate short of the main body portion and an O-ring 92 is provided to fill the gap and form a continuation as part of the sleeve.

In addition to functioning as a mask, the elastomeric masking sleeve resiliently urges the gripping fingers radially inwardly for engaging the neck of the bottle. In order to provide adequate gripping force, the masking sleeve preferably has formed integrally therewith a radially thickened annular portion 91 that functions as an elastomeric band much like the O-rings previously used in similar prior art chucks. The radially inwardly protruding annular band is captured in the grooves 87 formed at the radially outer sides of the gripping fingers.

In use, the masking sleeve 90 will protect against overspray from accumulating on the gripping fingers. Instead, any overspray will accumulate on the exterior surface of the masking sleeve. Periodically the masking sleeve may be slipped off of the chuck and manipulated by flexing and/or twisting to cause the built-up layer of spray material to crack and fall away from the masking sleeve. The masking sleeve may then be reinstalled on the same or another chuck. As will be appreciated by those skilled in the art, the sleeve should be made of a material compatible with the particular spray material being utilized to coat the bottle or other article. An exemplary material is silicone rubber which has been found to be particularly advantageous for use with coating materials applied to carbonated beverage bottles to prevent $CO_2$ loss through the thin plastic walls of the bottle.

The masking sleeve 90 is the subject of copending application No. / of Robert H. Keown, Roger L. Judson, Joseph R. Lawn and Kenneth A. Krismanth, filed even date herewith and entitled *CONTAINER TRANSFER SYSTEM FOR COATING LINE WITH ROTARY UNLOADER AND CHUCK MASKING SLEEVE.*

The main body 80 of the chuck has a transverse dimension greater than the circumferential arrangement of gripping fingers 81. Accordingly, there is formed at the bottom of the main body a shoulder or abutment surface 93 that extends radially outwardly beyond the gripping fingers. The main body also has an upper abutment surface 94 that extends radially outwardly from the spindle. As is preferred, the main body may be generally cylindrical to form an annular abutment surface for engagement by an actuating cam or cams that control the position of the chuck on the spindle in the hereinafter described manner.

In normal operation of the holding device, a bottle B is telescopically inserted at its neck and into the socket formed by the gripping fingers when the chuck is in its lowermost or axially outer position. As the neck of the bottle is inserted, the fingers 81 will be cammed radially outwardly against the resilient restoring force exerted thereon by the masking sleeve including, in particular, the radially thickened band portion 91 thereof, as well as against the resilient restoring force of the fingers themselves. The chuck, including the gripping fingers, is made of a material such as polytetrafluoroethylene (PTFE) which has some inherent flexibility that is supplemented by the elastomeric masking sleeve and/or band. Also, PTFE provides non-stick, high wear resistant and low friction surfaces for engaging the bottles and cams (stops) in the herein described manner. Preferably, the axially outer edges of the latching dogs 86 are chamfered to form a conical guide that facilitates insertion and expansion of the fingers as the bottle neck is inserted therebetween.

In the illustrated embodiment, the bottle is inserted until such time that the inwardly protruding latching dogs 86 at the axially outer ends of the gripping fingers 81 are received in the annular groove 85 formed between the annular bead and flange, the fingers preferably being configured such that this corresponds with the top of the bottle engaging the plug as shown in FIG. 4. When thus inserted, the bottle will be securely held to the spindle for rotation and horizontal translating movement therewith.

Figure 5:
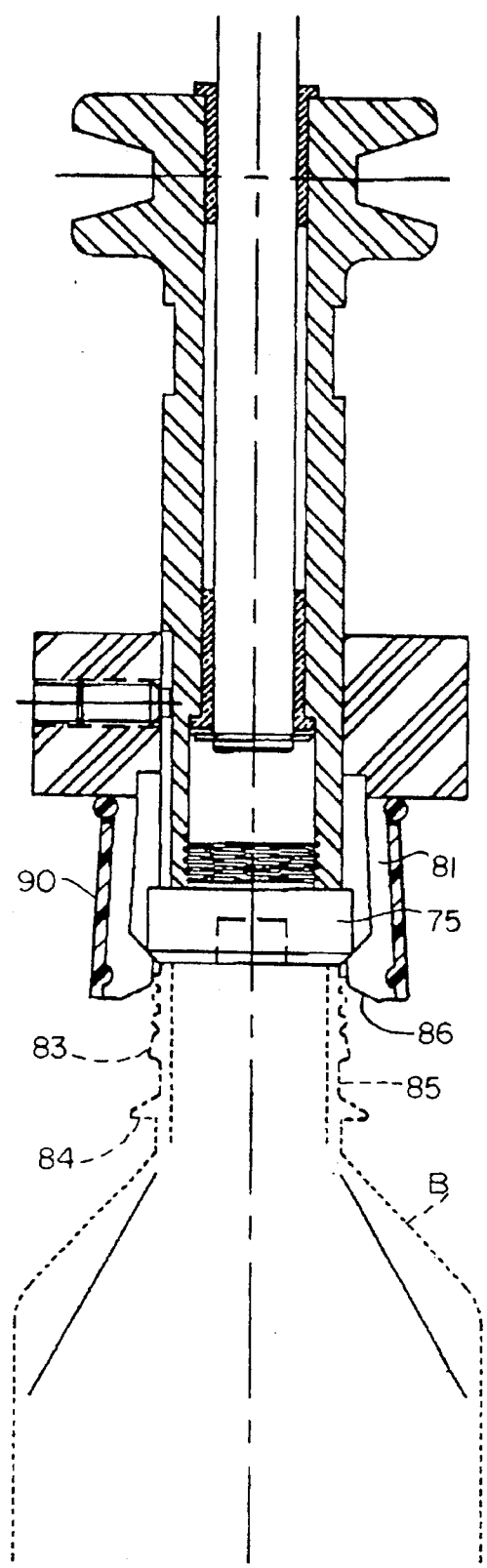
FIG. 5 is a view similar to FIG. 4, showing the chuck of the holding device in its upper or release position.

To discharge a bottle from the chuck 68, the chuck is moved from its axially outermost/lower position to an axially innermost/upper position shown in FIG. 5. As the chuck is raised on the spindle the plug 75 functions as a plunger engaging the top of the bottle and pushing the bottle telescopically out of the chuck socket. As the neck of the bottle is ejected from the chuck, the fingers will flex radially outwardly to allow the external features of the bottle's neck to pass thereby. Such loading and unloading of a bottle is effected automatically by the hereinafter described loader and unloader, respectively. Preferably, the outer edge of the plug and the axially inner edges of the latching dogs are chamfered to facilitate radially outward camming of the latching dogs at the release end of the chuck stroke to move the latching dogs radially clear of the neck of the bottle as shown in FIG. 5 to prevent bottle hang-up.

THE LOADER

Figure 6:
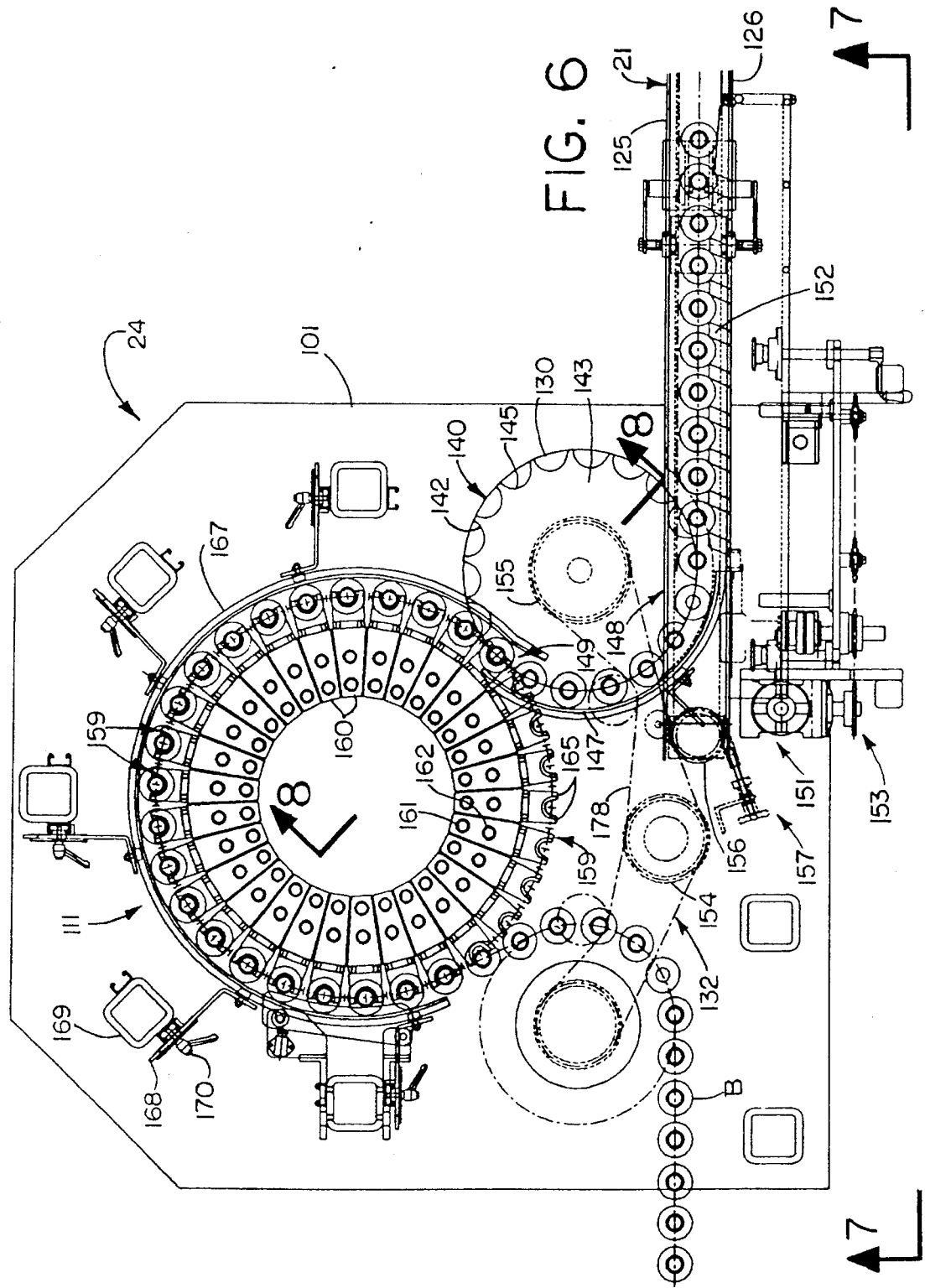
FIG. 6 is a schematic plan view of the loader for loading bottles onto the holding devices of the carrier conveyor.
Figure 7:
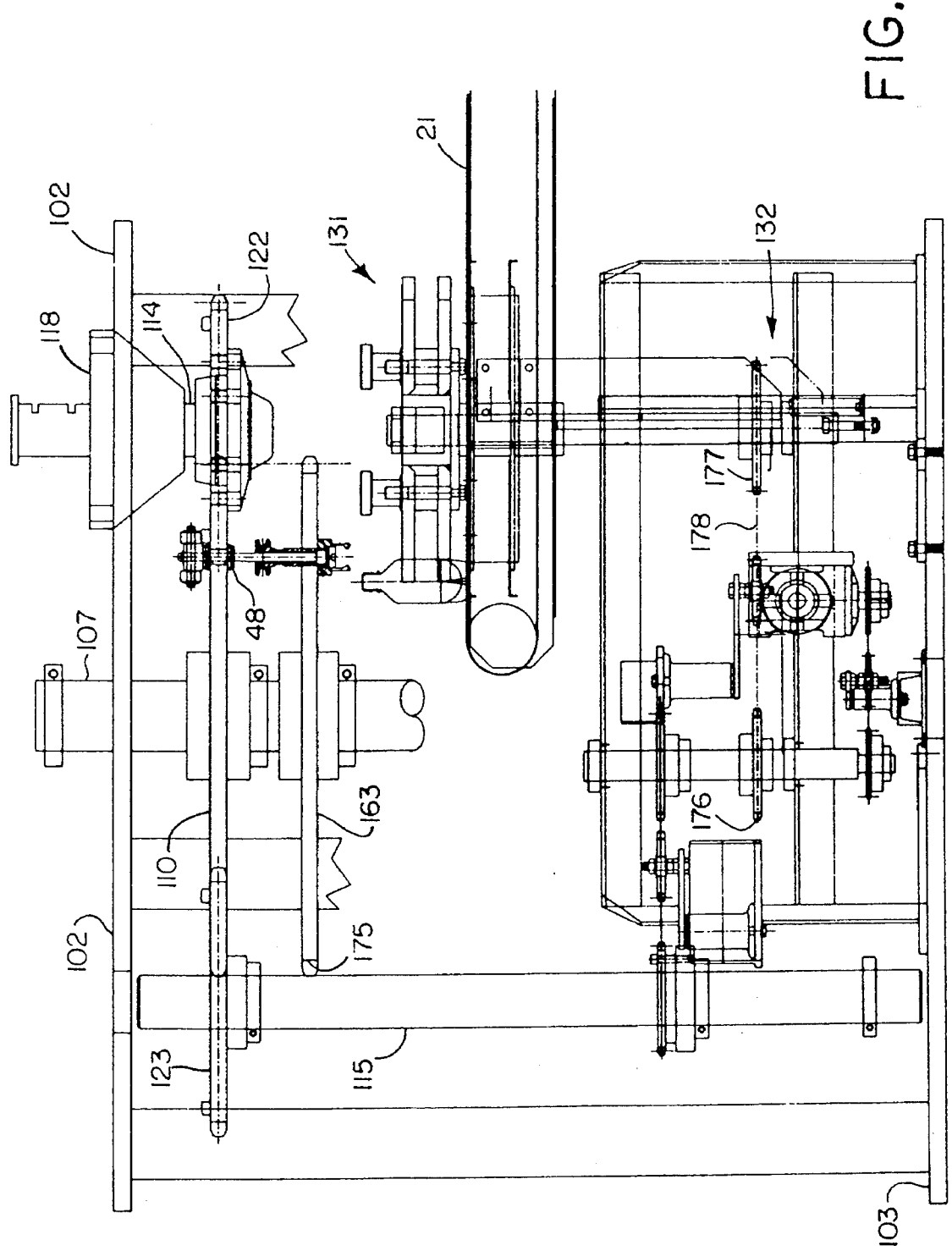
FIG. 7 is a side elevational view of the loader looking generally from the line 7—7 of FIG. 6.
Figure 8:
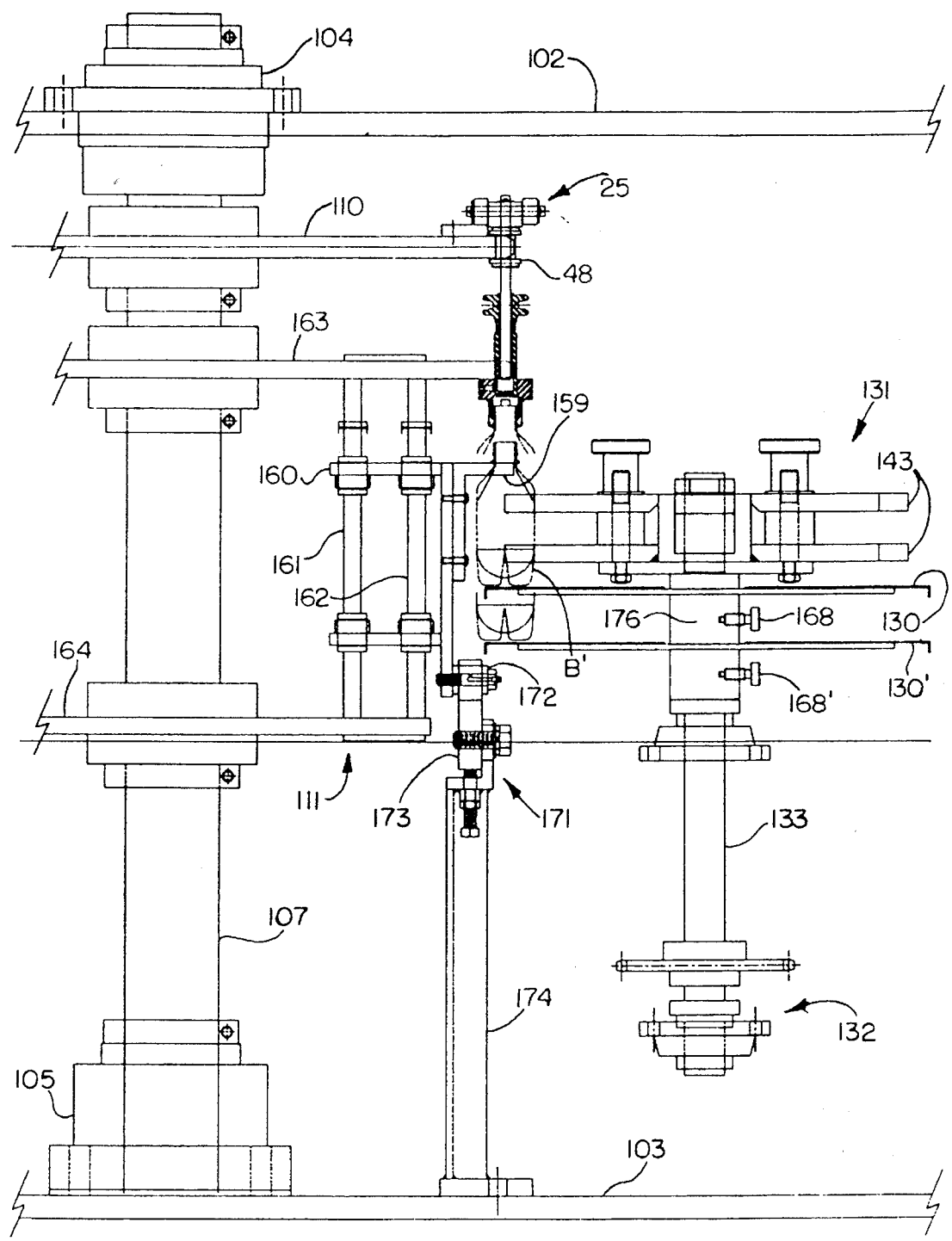
FIG. 8 is a cross-sectional view of the loader looking generally from the line 8—8 of FIG. 6.

Referring now to FIGS. 6–8, pertinent portions of the loader 24 are shown. As above indicated, the loader 24 transfers the bottles B from an infeed conveyor 21 to the holding devices of the carrier conveyor. The loader comprises a fabricated frame 101 to which operative components of the mechanism are mounted. More particularly, the frame includes top and bottom frame plates 102 and 103 to which upper and lower bearing housings 104 and 105 are mounted. A vertical main shaft 107 is journalled within vertically aligned bearings respectively retained in the upper and lower bearing housings. The main shaft has secured thereto a sprocket 110 over which the conveyor chain 48 of the carrier conveyor 25 is trained for rotating the main shaft in proper timed relationship with respect to the conveyor chain and, more particularly, the holding devices carried by the conveyor chain. The main shaft also supports for rotation therewith a main or loading carousel 111 which is hereinafter described in greater detail.

The loader 24 also comprises two other vertical shafts 114 and 115 that are suitably mounted to the frame 101. The vertical shaft, herein referred to as an input shaft, is mounted to the upper frame plate 102 by a bearing assembly 118. The vertical shaft 115, herein referred to as an output shaft, is journalled between top and bottom bearings (not shown) mounted to the upper and lower frame plates 102 and 103.

The input and output shafts 114 and 115 have secured thereto respective sprockets 122 and 123. The sprockets 122 and 123 are located at the same vertical height as the main shaft sprocket 110 which is located in the upper region of the frame 101. The conveyor chain 48 is trained over the sprockets such that the chain passes around the sprocket 122 in a clockwise direction, then the sprocket 110 in a counter-clockwise direction, and then the sprocket 123 in a clockwise direction, as viewed in FIG. 6.

The remaining components of the loader 24 will now be described in relation to the path of bottles B through the loader. As seen in FIG. 6 the bottles are guided by side rails 125 and 126 which form an entry chute. The bottles are fed single file through the chute by the infeed conveyor 21. The bottles are fed single file onto a rotating shelf plate 130 of an input carousel 131 mounted to the frame 101 with its rotation axis coaxial with the rotation axis of the input sprocket 122. The input carousel 131 is rotatably driven in timed relationship with the conveyor through a suitable drive assembly 132 interconnecting the input carousel shaft 133 to the output shaft 115.

The input carousel 131 is provided with a plurality of circumferentially equally spaced apart positioning members 140. In the illustrated preferred embodiment, the positioning members 140 are formed by respective pairs of teeth 142 of one or more a star wheels 143 concentrically mounted to the carousel input shaft for rotation therewith. The star wheel teeth form therebetween arcuate recesses 145 for receiving therein respective bottles. In the illustrated embodiment two vertically spaced apart star wheels are employed to position the bottles as they rotate along an arcuate path.

As the bottles are fed onto the radially outer shelf area of the rotating plate 130 underlying the recesses 145 in the star wheels 143, they are sequentially received in the recesses and rotatably carried thereby and by the rotating plate in a clockwise direction looking at FIG. 6. During such clockwise movement of the bottles, an arcuate guide or containment rail or rails 147 concentric with the rotating plate keep the bottles on the rotating plate. The containment rail also holds the bottles seated in respective recesses in the star wheels properly to equally circumferentially space the bottles. That is, the containment rail cooperates with the star wheel recesses precisely to position the bottles being rotatably carried on the rotating plate from an entry zone 148 at the end of the chute 127 through approximately 135° to a transfer zone 149. At the transfer zone the bottles are transferred from the input carousel to the loading carousel.

In order to properly space the bottles on the infeed conveyor 21 for sequential receipt in the recesses of the star wheels 140, a timing screw feed mechanism 151 is employed. The timing screw feed mechanism may be of conventional type including a timing screw 152 extending parallel to the exit end of the infeed conveyor 21 at the side of the chute opposite the infeed carousel 131. The timing screw is rotatably driven in timed relationship with the conveyor through a suitable drive assembly 153 interconnecting the timing screw to the output shaft 115 of the loader.

Preferably provision is made for varying the phase between the timing screw, the input carousel and loading carousel. This may be accomplished by any suitable means. For example, drive chains may be used to operatively drive the input carousel and timing screw off of the output shaft 115. The phase between a drive sprocket 154 and a driver sprocket 155 around which a chain 178 is trained to form a part of the drive train may be varied as by using an idler sprocket 156, wheel or the like and an adjust mechanism 157 which moves the sprocket 156 into and out of the path of the chain to vary the length of the path of the chain extending between the driven and drive sprockets.

The loading carousel 111 includes a plurality of positioning members 159 circumferentially equally spaced around the rotational axis of the loading carousel, i.e., the axis of the main shaft 107. The positioning members 159 are respectively mounted on vertically moveable elevators 160 which are guided for vertical movement by respective pairs of guide shafts 161 and 162 journalled between top and bottom plates 163 and 164 mounted to the main shaft for rotation therewith. Each positioning member has a radially outwardly extending horizontal positioning arm having at the radially outer end thereof a pair of circumferentially spaced lift arms 165 that receive in a recess 166 formed therebetween the neck of the bottle at a position beneath the annular neck flange. Preferably, the lift arms form therebetween an arcuate recess 166 closely conforming to the outer diameter of the bottle neck for precise radial as well as circumferential positioning of the bottle.

The loading carousel 111 is rotated in timed relation to the input carousel 131 for smooth timed transfer of bottles from the rotating plate/star wheel assembly to respective positioning members 159 of the loading carousel. In the illustrated embodiment, the input carousel rotates at an angular speed greater than that of the loading carousel inasmuch as there are fewer recesses in the star wheels 143 than positioning members on the loading carousel.

The containment rail 147 extends sufficiently into the transfer zone 149 to keep each bottle nested in the recesses of the input carousel star wheels 143 until such time that the bottle is received in the recess of a positioning member 159. As the positioning members 159 rotate through the transfer zone and advance the bottle from the constraint of the containment rail, the bottle will be engaged by an arcuate guide or containment rail 167 which is concentric with the rotation axis of the loading carousel. Then, as the bottles move out of the transfer zone, the containment rail will hold the necks of the bottle seated in the recess of the positioning member. The containment rail may consist of plural arcuate segments mounted by brackets 168 to uprights 169 preferably by quick adjustment devices 170 that permit vertical adjustment of the arcuate segments.

Once the bottle is captured between the containment rail 167 and a positioning member 159, the bottle will be caused to slide off of the rotating plate 130 of the input carousel 131. At this point, the bottle will be supported at its neck flange 84 (FIGS. 4 and 5) by the positioning member as best shown in FIG. 8. The bottle will be rotatably carried by the positioning member around the axis of the main shaft 107 with the positioning member operating to position precisely the bottle with respect to other bottles already transferred onto the loading carousel for smooth transferring of the bottles onto the holding devices 26 of the carrier conveyor 25 in the following manner.

As the loading carousel 111 rotates, being driven by the conveyor chain 48, each positioning member 159 is raised to move the bottle supported thereon at its neck flange upwardly to engagement with and onto a respective holding device 26 carried by the conveyor chain 48. As above indicated, the conveyor chain is trained over the main shaft sprocket 110 to rotate the loading carousel in timed relation to linear movement of the conveyor chain along the arcuate path determined by the sprocket. The sprocket is concentric with the main shaft and hence with the circumferential path of the positioning members. That is, the centers of the bottles will be aligned vertically beneath the centers of the respective holding devices carried by the conveyor chain, especially at the point when the bottle starts to be telescopically inserted into the chuck 68 of the holding device (before and after this point, more play can be tolerated). As a result the arcuate path of the holding devices is coextensive with a portion of the circumferential path of the bottles captured in the positioning members and within this region the bottles sequentially are raised by the positioning members and loaded onto the holding devices for subsequent transfer out of the loader by the carrier chain.

After the positioning member 159 pushes a bottle supported thereon into the chuck 68 of a holding device 26 aligned therewith, the positioning member is lowered for return to its original height for receiving another bottle as it passes through the transfer station 149.

In the illustrated preferred embodiment, a circular cam mechanism 171 is employed to control raising and lowering of the positioning members 159. The elevators 160 to which the positioning members are mounted are each equipped with a cam follower 172 that rides on a circular lift cam 173. The circular lift cam is mounted by uprights 174 to the lower frame plate 103. The lift cam is in the form of a ring that is concentric with the axis of the main shaft 107. The lift cam has sufficient rise to effect loading of a bottle onto a loading device in the previously described manner. The slope of the lift cam may be selected as desired to provide for progressive raising of the bottle for smooth loading onto a loading device.

As a bottle is being loaded onto a holding device 26, the holding device is held against vertical upward movement during upward pushing of the bottle into the chuck 68 by the upper plate 163 which engages the top abutment surface of the main body of the chuck. Preferably the upper plate 163 is formed at its circumference with a plurality of circumferentially equally spaced recesses 175 for receiving and supporting therein the spindles 66 of the holding devices to prevent or minimize any shifting of the spindle during the loading operation. The holding device is also stabilized by the main shaft sprocket 110 engaging the chain 48.

With the bottle pushed fully into a chuck, the bottle will be firmly gripped and held by the holding device as aforedescribed. This occurs at a point a short distance before the carrier chain passes from the main shaft sprocket 110 to the output shaft sprocket 123. This point corresponds to the uppermost rise of the lift cam 173. Preferably the lift cam will continue circumferentially at the same elevation until a point at which the positioning devices are fully clear of the bottles then moving from the loading carousel to the output shaft sprocket. At this point the cam surface slopes downwardly for positioning the positioning members at the proper height for receiving a bottle at the transfer station 149.

The illustrated bottle loader can be easily adjusted to allow for transfer of bottles of different heights, such as bottle B' (FIG. 8). For example, the rotating plate 130 may be lowered to another position 130' to accommodate a taller bottle. To facilitate axial adjustment of the rotating plate 130, the rotating plate is mounted to the shaft 133 by a tubular member or slide 176 which is slidable along the shaft 133. In the illustrated embodiment designed to accommodate two different heights of bottles, a detent pin 168 is provided to releasably lock the sleeve 167 in relatively upper and lower positions through cooperation with holes in the shaft. Of course, the height of the infeed conveyor 21 will need to be adjusted accordingly to accommodate a different height of the bottle.

The bottle loader may also be adapted to accommodate different diameters of bottles as well as different shapes. The input carousel star wheels 143 may be replaced with star wheels having circumferential recesses of other radii or shape, or by other positioning members. Similarly, the positioning members of the loading carousel may be replaced with other positioning members having different diameter or shape recesses for accommodating other configurations of bottles or, more generally, other articles.

THE UNLOADER

Figure 9:
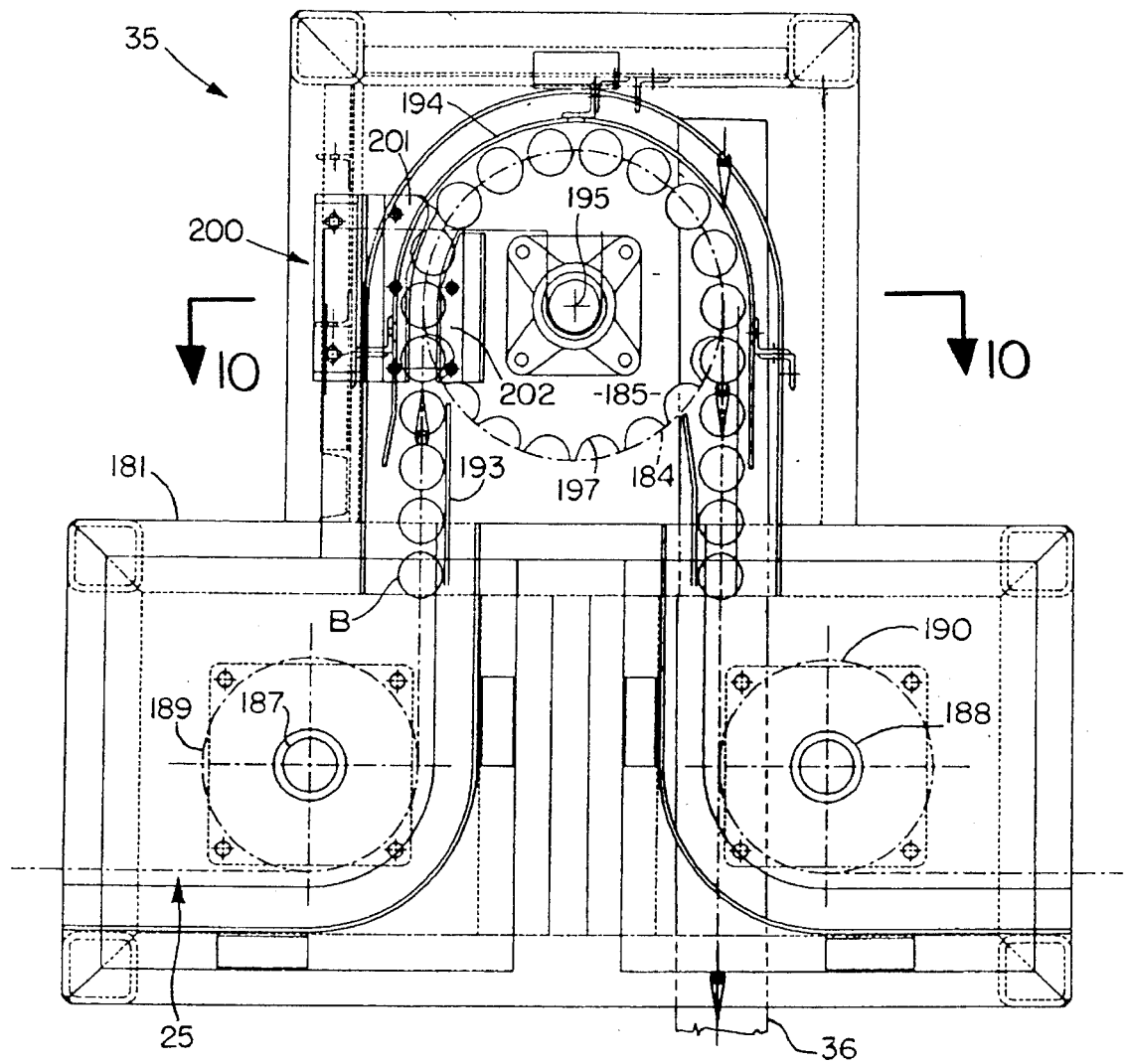
FIG. 9 is a schematic plan view of the unloader for unloading bottles from the holding devices of the carrier conveyor.
Figure 10:
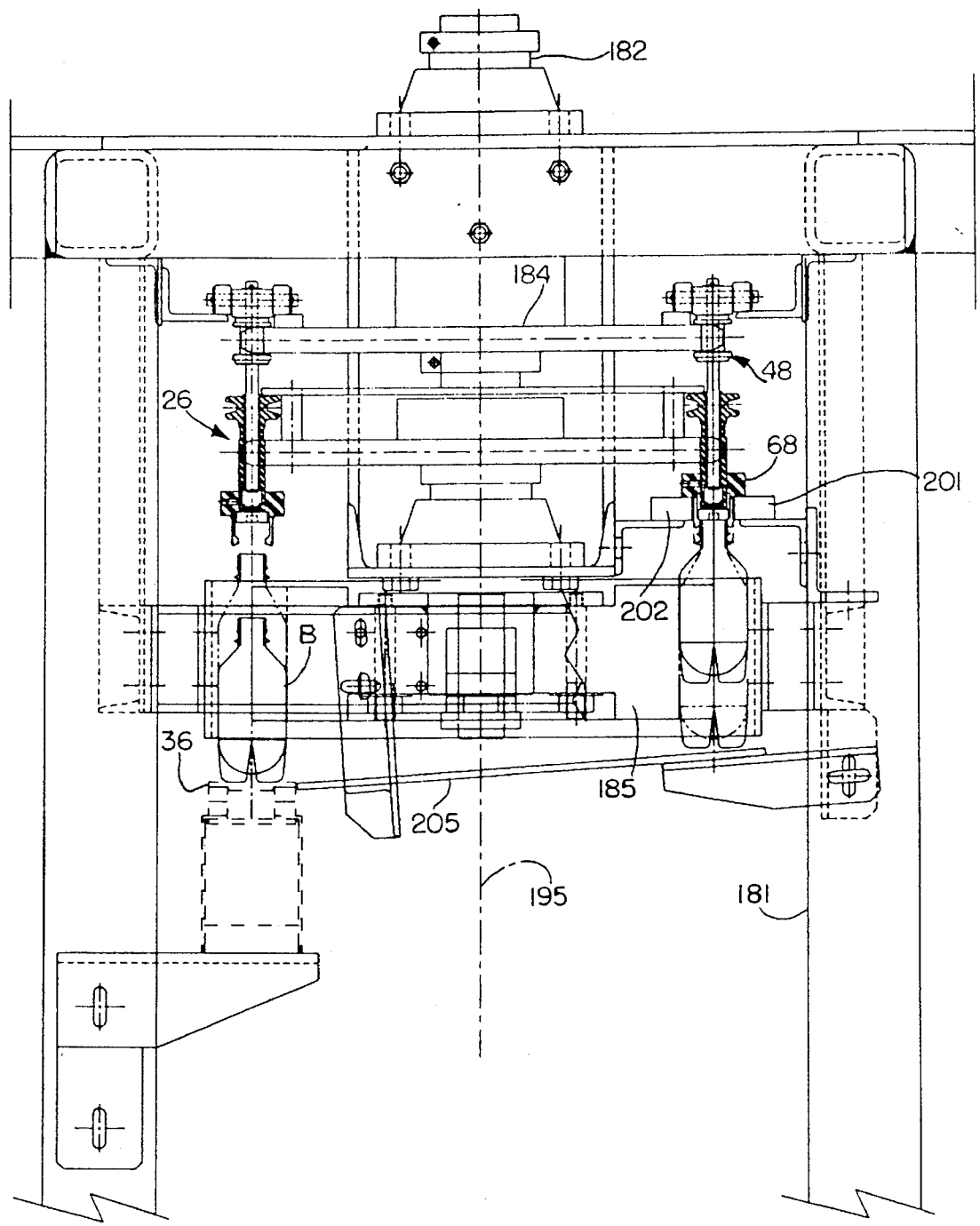
FIG. 10 is a cross-sectional view of the loader looking generally from the line 10—10 of FIG. 9.

Referring now to FIGS. 9 and 10, pertinent portions of the unloader 35 are shown. As above indicated, the unloader removes bottles from the holding devices of the carrier conveyor and transfers the bottles to the take-away conveyor 36. The unloader comprises a fabricated frame 181 to which operative components of the mechanism are mounted. More particularly, the frame has mounted therein a vertical shaft 182 that has secured thereto a sprocket 184 over which the conveyor chain 48 of the carrier conveyor 25 is trained for rotating the shaft in proper timed relationship with respect to the conveyor chain and, more particularly, the holding devices carried by the conveyor chain. The shaft also supports for rotation therewith a bottle nest member such as star wheel 185.

The unloader 35 also comprises two other vertical shafts 187 and 188 that are suitably mounted to the frame 181. The vertical shafts 187 and 188, herein termed input and output shafts, have secured thereto respective sprockets 189 and 190. The sprockets 189 and 190 are located at the same vertical height as the main shaft sprocket 184. The conveyor chain is trained over the sprocket 189 such that the chain passes around the sprocket 189 in a counter-clockwise direction, then the sprocket 184 in a clockwise direction, and then the sprocket 190 in a counter-clockwise direction, as viewed in FIG. 9.

As the conveyor 25 moves from the sprocket 189 to the sprocket 184, the bottles carried thereby are laterally stabilized against a guide rail 193 which overlaps in the movement direction of the bottles the inclined entry end of an arcuate containment rail 194 which is concentric with the rotation axis 195 of the main shaft 182. The bottles are sequentially received in respective recesses 197 that are circumferentially spaced apart around the perimeter of the rotating bottle nest 185. The bottles are held in the recesses of the rotating nest by the containment rail 194, but with sufficient clearance to allow the bottles to slide downwardly in the recesses as the bottles are unloaded from the holding devices 26 of the conveyor.

The bottles are unloaded from the holding devices 26 by operation of an unloading cam assembly 200. The cam assembly 200 comprises a pair of laterally spaced apart cams 201 and 202 that define therebetween an arcuate path for the lower portion of the chucks 68 of the holding devices. The cams have inclined upper surfaces positioned in the path of the main body portion of the chucks such that the bottom abutment surfaces of the chucks engage the inclined cam surfaces over an arcuate path for pushing the chucks upwardly on the spindles. As the chucks are pushed upwardly on the spindles, the gripping fingers move upwardly and off of the neck of the bottle inasmuch as the bottle is prevented from following the chuck by reason of its top end engaging the plug which thereby functions as a plunger in essence ejecting the bottle from the relatively upwardly moving chuck.

When released from the chuck 68, the bottle is free to fall by gravity. The descent of the bottle, however, is controlled by a dead plate or shelf 205 of suitable shape which extends beneath the path of the bottles at an incline to the rotation axis 195 of the shaft 185 as best shown in FIG. 10. The bottles will slide along the dead plate along an arcuate path controlled by the rotating nest 185. As the bottles are moved by the rotating nest along an arcuate path over the dead plate the bottles will be progressively lowered to the height of the take-away conveyor 36 for transfer onto the take-away conveyor.

THE KNOCK-OFF MECHANISMS

In the event that a bottle becomes hung up on a holding device 26 and fails to unload at the unloader 35 for some reason, the knock-off mechanism 42 will ensure removal of the hung-up bottle prior to passage of the holding device to the loader 24. As shown in FIGS. 11–13, the knock-off mechanism 42 comprises at least one and preferably two chuck actuating cams 210 provided on opposite sides of the path of the chuck 68 along the region of the conveyor at which the knock-off mechanism is located. In the illustrated embodiment, the cams 210 are in the form of flat elongated plates or strips which are secured to the lower leg of an L-shape support bracket 213 so as to extend parallel to the path of the conveyor. The brackets 213 are supported at their upstream ends by pivots 216 mounted in any suitable means to associated conveyor frame structure 214 at the location of the knock-off device, such as uprights 215. The opposite or downstream end of each bracket is supported by a vertically oriented turnbuckle 217 or similar device from available overhead frame structure, such as brackets 218 secured to the top of the conveyor track 219 for the conveyor chain 48. By adjusting the length of the turnbuckles, the height of the downstream end of the cam can be adjusted relative to the upstream end to vary the inclination of the cam relative to the direction of movement of the conveyor and, more particularly, the movement path of the chucks 68.

The upstream end of the cams 210 are at a height such that the main body portion of the chuck will move thereover and be engaged at the bottom engagement surface thereof by the top surface of the cam plates as the chuck is moved along the conveyor path by the conveyor chain. The sloped cam surfaces will cause the chuck to be progressively raised while upward movement of the bottle is precluded by engagement against the plunger end 75 of the spindle. The chuck is sufficiently raised to ensure that the bottle is ejected therefrom before moving off of the cam plates. After the chuck moves off the cam plates, it is then free to drop to its lower position resting atop the overhang of the stop surface formed by the radially protruding plug. The loader may be provided with cams at its entry end to engage and force down any chucks that may be stuck in a raised position.

As is preferred, the spindle 66 is preferably stabilized and retained against any upward movement by at least one and preferably a pair of cams 123 laterally spaced apart on opposite sides of the path of the attachment pin 65. In the illustrated embodiment, the cams are in the form of cam strips having horizontal bottom cam surfaces 124 co-extensive with the inclined chuck actuator cam strips along the path of the conveyor. Preferably the spindle cam strips have a sloping lead-in surface 125 to capture and guide the spindle onto the horizontal cam surface, the top surface of the spindle engaging and sliding along the cam surfaces. Preferably the upstream ends of the spindle support cam strips are located more upstream than the upstream ends of the operator cam strips 210 to ensure that the spindles are engaged and stabilized prior to the chuck being raised relative to the spindle.

Figure 14:
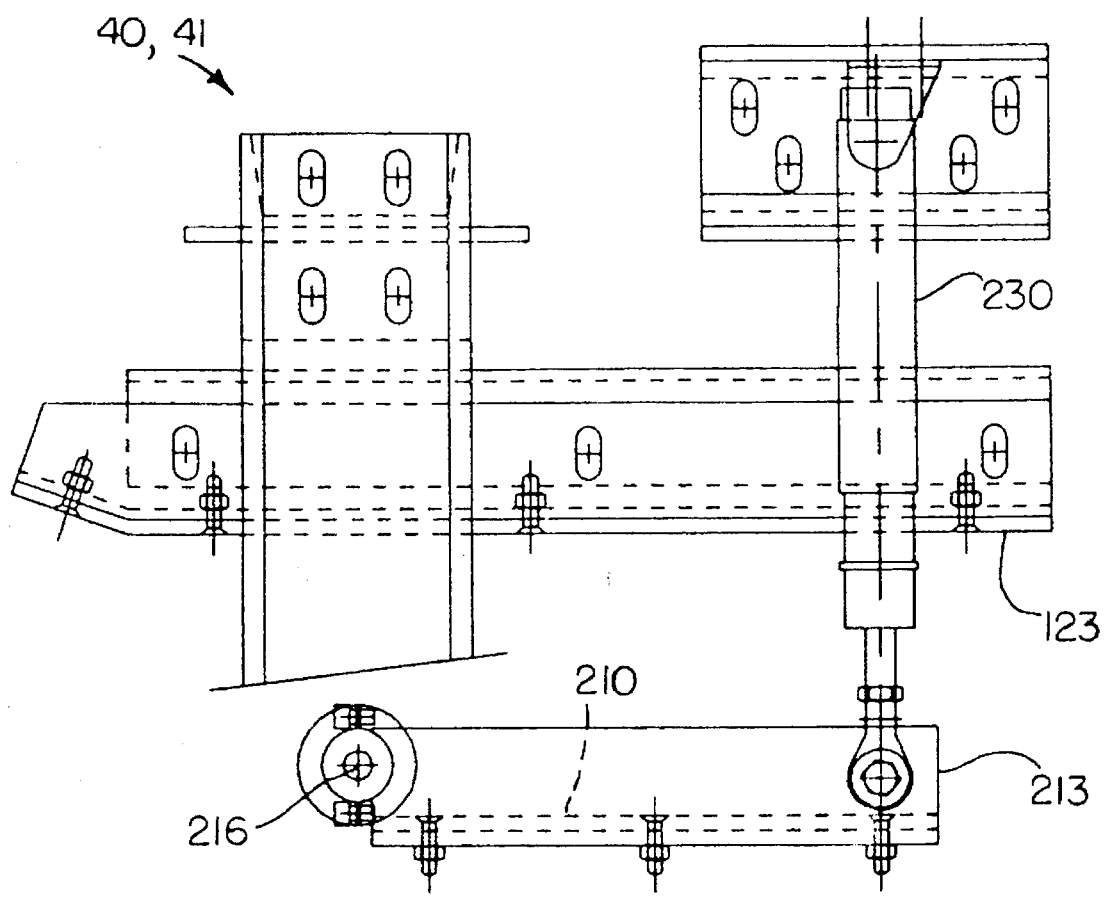
FIG. 14 is a side elevational view of another knock-off mechanism employed in the system of FIG. 1.

The knock-off mechanisms 40 and 41 are of the same construction that is similar to the construction of the knock-off mechanism 42. As illustrated in FIG. 14, the only difference is that each turnbuckle is replaced by an actuator such as a piston-cylinder assembly 230 that may be pneumatically or hydraulically operated for automatic control of the cam. Usually the cams will be located in a lower horizontal or ambush position shown in FIG. 14 allowing free passage of the chucks of holding devices thereby. However, should it be desired to remove bottles at the location of either knock-off mechanism, the actuators may be retracted to swing the cams upwardly into the path of the chucks and at an incline as shown in FIG. 11 for effecting removal of a bottle or bottles from the chucks. Bottles will be removed until such time that the actuator is extended to move the cams back to their ambush position. In this manner, bottles may be selectively removed from the conveyor at strategic locations along the conveyor path.

Although the invention has been shown and described with respect to an exemplary embodiment thereof, it is obvious that equivalent alterations and modifications will occur to others skilled in the art upon the reading and understanding of the specification. The present invention includes all such equivalent alteration and modification, and is limited only by the scope of the following claims.

What is claimed is:

1. An article conveying device comprising
    a conveyor,
    at least one article holder attached to said conveyor for movement therewith along a conveyor path,
    said article holder including
        a support member having an axis extending generally perpendicular to said conveyor path, and
        a chuck carried on said support member for telescoping axial movement between first and second axially displaced positions,
        said chuck being radially expandable and contractible and having an interior socket for receiving therein an end of an article to be gripped by the chuck when said chuck is in said first position,
        said support member having a plunger portion movable axially into said socket when said chuck moves from said first position on said support member to said second position for engaging and axially ejecting the article out of said socket.

2. A conveying device as set forth in claim 1, for use with articles of the type having a circumferential flange,
    wherein said at least one article holder includes a plurality of article holders attached to said conveyor for movement therewith along a conveyor path, and further comprising
        a transfer device for transferring the articles from an infeed conveyor and sequentially presenting the articles to a transfer station, a rotary device for receiving the articles from the transfer device at said transfer station and for rotatably carrying the articles away from said transfer station along an arcuate path, said rotary device including a circumferential arrangement of positioning members for circumferentially spacing the articles, each said positioning member including a pair of laterally spaced apart arms for receiving therebetween the article and for supportingly engaging the underside of the circumferential flange of the article, guide structure for guiding said holding devices of said conveyor above and coextensively with a portion of said arcuate path in timed relationship with said positioning members, and lift structure for progressively axially raising said positioning members during travel through said portion of said arcuate path for loading the articles onto said article holding devices of said overhead conveyor.

3. A conveying device as set forth in claim 2, wherein said lift structure includes a carrousel having a vertical rotational axis and a circumferential arrangement of lift devices mounted to said carrousel for vertical movement, said positioning members respectively being carried on said lift devices.

4. A conveying device as set forth in claim 3, wherein said lift structure includes arcuate cam means for controllably raising said lift devices.

5. A conveying device as set forth in claim 3, wherein said lift structure includes an arcuate cam for controllably raising said positioning members.

6. A conveying device as set forth in claim 2, wherein said transfer device includes rotating means for receiving articles from the infeed conveyor at a first location and for rotatably carrying the articles to said transfer station, said rotating means including positioning means for circumferentially equally spacing the articles carried by said rotating means.

7. A conveying device as set forth in claim 6, wherein said rotating means includes rotating plate means for supporting the articles carried thereon, and said positioning means includes means forming a circumferential arrangement of radially outwardly opening recesses for receiving and positioning articles.

8. A conveying device as set forth in claim 7, including means for adjusting the elevation of said rotating plate means for accommodating different heights of articles.

9. A conveying device as set forth in claim 6, wherein said means forming a circumferential arrangement of radially outwardly opening recesses includes a star wheel including said radially outwardly opening recesses around the periphery thereof.

10. A conveying device as set forth in claim 2, wherein said conveyor includes a conveyor chain, and support members of said article holders are dependently supported from said conveyor chain at respective spaced apart positions along the length of said conveyor chain.

11. A conveying device as set forth in claim 10, wherein said guide structure includes a sprocket for said conveyor chain and star wheel means for supporting said support members intermediate said conveyor chain and said chucks.

12. A conveying device as set forth in claim 10, wherein said chucks is maintained at a constant elevation relative to said conveyor chain as it moves coextensively with said portion of said arcuate path.

13. A conveying device as set forth in claim 1, wherein said support member has a main portion to which said plunger portion is removably connected, and said chuck is retained on said support member by said plunger portion that forms an axial obstruction preventing said chuck from separating from said support member.

14. A conveying device as set forth in claim 1, wherein said chuck includes a base supported on said support member at an end thereof and a circumferential arrangement of radially movable gripping fingers extending axially outwardly from said base and defining therebetween a socket for receiving therein an end of an article to be gripped.

15. A conveying device as set forth in claim 1, wherein said at least one article holder includes a plurality of article holders attached to said conveyor for movement therewith along a conveyor path, and further comprising cam means for moving the chuck relative to said support member as the article holders are sequentially moved to engagement therewith by said conveyor, and means for selectively moving said cam means from an ambush position allowing said article holders to pass thereby without being engaged by said cam means to an operating position locating said cam means in the path of said chuck for moving said chuck relative to said support member for releasing an article from said article holder.

16. A conveying device as set forth in claim 15, wherein said cam means is supported for pivotal movement about an axis extending perpendicular to said path of said conveyor, and said means for selectively moving includes linear extension and retraction means for swinging said cam means into and out of the path of said chucks.

17. A method of processing an article comprising the steps of:

supporting articles to be processed on respective article holders attached to a conveyor for movement therewith along a conveyor path, each article holder including a support member having an axis extending generally perpendicular to said conveyor path, and a chuck carried on said support member for telescoping axial movement for between first and second axially displaced positions, said chuck being radially expandable and contractible and having an interior socket for receiving therein an end of an article to be gripped by the chuck when said chuck is in said first position, said support member having a plunger portion movable axially into said socket when said chuck moves from said first position on said support member to said second position for engaging and axially ejecting the article out of said socket;

moving the conveyor along said conveyor path through a loading, processing and unloading stations;

loading articles onto the holders at the loading station;

performing a processing function on the articles at the processing station; and unloading articles from the holders at the unloading station.

18. An article conveying device comprising a conveyor, at least one article holder attached to said conveyor for movement therewith along a conveyor path, said article holder including a support member having an axis extending generally perpendicular to said conveyor path, and a chuck carried on said support member for telescoping axial movement between first and second axially displaced positions, said chuck being radially expandable and contractible and having an interior socket for receiving therein an end portion of an article to be gripped by the chuck when said chuck is in said first position, said chuck having at least one gripping finger at least partially defining said socket, said gripping finger including an article-engaging cam surface which is inclined with respect to the axis of the support member, and a plunger movable axially into said socket when said chuck moves from said first position on said support member to said second position for urging the article against the cam surface of the finger to expand the fingers and so eject the article from said socket.

19. The device of claim 18, wherein said chuck includes a plurality of said gripping fingers, said gripping fingers being radially movable in response to movement of the article to permit the article to be removed from said chuck.

20. A method of processing an article comprising the steps of gripping the article in a chuck which is carried by and telescopically mounted on a support member carried by a conveyor, the chuck having a socket at least partially defined by at least one resilient gripping finger, and the gripping finger having an inclined cam surface engaging the article to retain the article in the socket, moving the conveyor for transfer of the article held by the chuck through at least one processing station for performing a processing operation on the article, and ejecting the article from the chuck by axially moving a plunger relative to the gripping finger to urge the article against the inclined surface of the gripping finger to cam the gripping finger outwardly for ejecting the article from the socket.

21. The method of claim 20, wherein the step of gripping the article includes the step of gripping the article in a chuck which has a plurality of resilient gripping fingers each having an inclined cam gripping surface and which at least partially define the socket, and the step of ejecting the article includes axially moving a plunger relative to gripping fingers to urge the article against the inclined cam surfaces of the gripping fingers to cam the gripping fingers outwardly for ejecting the article from the socket.

22. An article holder for receiving an article and for conveying the article along a path, said holder comprising a support member having an axis extending transverse to the path, and a chuck telescopically carried on said support member, said chuck being moveable between first and second positions on said support member, said positions being axially displaced from each other, said chuck having a plurality of gripping fingers at least partially defining an internal socket for receiving an end portion of the article to be gripped when said chuck is in said first position, the gripping fingers having an article-engaging cam surface inclined with respect to the axis of the support member disposed to engage the article when the article is in the socket, the support member having a plunger portion movable into the socket to engage the end portion of the article and to push the article against the cam surfaces causing the fingers to move radially outward and so to eject the article from the socket.

23. The article holder of claim 22, wherein the chuck includes abutment surfaces for engagement with a cam to move the chuck between the first and second positions.

24. The article holder of claim 22, including a pin, and said support member includes a spindle supported on said pin for rotation about the axis of said pin.

* * * * *